April 9, 1929.  T. J. WORRELL ET AL  1,708,346
TIRE REPAIR TOOL
Filed July 26, 1927
Fig. 1.
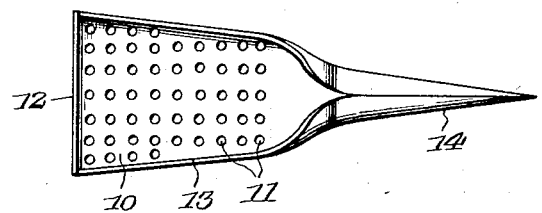
Fig. 3.
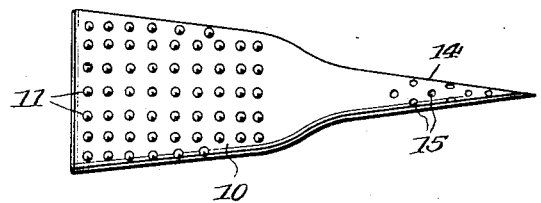
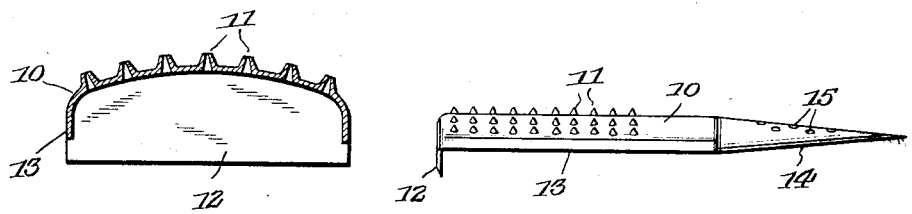
Fig. 4.  Fig. 2.
T.J. Worrell,
L.E. Clark, Inventors
By Chuck & Chuck
their Attorneys Patented Apr. 9, 1929.

1,708,346

UNITED STATES PATENT OFFICE.

TEMP J. WORRELL AND LONNIE E. CLARK, OF MEMPHIS, TEXAS.

TIRE-REPAIR TOOL.

Application filed July 26, 1927. Serial No. 208,508.

This invention relates to improvements in tire repair tools and particularly to a tool for facilitating the repair of punctures in tubes now commonly used in pneumatic tires.

One object of the invention is to provide an inexpensive tool with which a punctured tube may be scraped to clean the surface around the puncture and then rubbed to provide a roughened surface on which the patch is to be cemented.

A further object of the invention is to provide a tool of this character provided with means for facilitating the rapid deflation of a punctured tube.

In the accompanying drawings,—

Figure 1 is a plan view of a tool embodying the present improvements;

Fig. 2 is a side elevational view; and

Fig. 3 is a bottom plan view.

Fig. 4 is a transverse sectional view taken centrally of the tool.

In the preferred embodiment of the invention the tool is made of a single piece of sheet metal. The tool comprises a body portion 10 whose top surface is roughened as by punching a multiplicity of holes 11 therein, the ragged edges of the metal projecting on the top face of the tool providing a surface sufficiently rough to permit the surface of the tube to be roughened as is commonly done preparatory to cementing a patch over a puncture in the tube. Before thus roughening the surface of the tube it is always better to clean that portion of the tube surface around the puncture and for this purpose one edge portion, preferably an end, of the tool is turned upwardly or offset as at 12, the edge of this offset portion being beveled or otherwise sharpened to form a scraping edge.

Preferably, a comparatively light sheet of metal is used, but rigidity is imparted to the tool by having the two side edges of the body portion 10 turned upwardly or offset as at 13. In this way the body portion is reinforced and will not flex when the tool is being used either for scraping or roughening the surface of the tube.

Quite frequently the puncture in an inflated tire or tube is so small that the air will escape very slowly requiring the air valve of the tube to be unseated to permit of a more rapid escape of the air. Even this is a slow and rather tedious process and to avoid the same the present tool is provided with a tubular portion extending from the body portion at the end opposite the scraper 12. Preferably, this tubular portion 14 is pointed, as by being tapered and near its smaller end or outer extremity it is provided with a series of perforations 15. Its larger end, of course, is open so that by inserting the pointed end through the puncture in a tube, air within the tube may pass through the perforations 15 and escape through the open end of said tubular portion. In this way the tube may be rapidly deflated without manipulating the air valve at all.

In using the present tool the puncture, which may be a rather slow leak, is first located and the tapered portion of the tool inserted so as to completely deflate the tire. The surface around the puncture is then scraped with the scraping edge 12 and after being thus cleaned it is roughened by rubbing it with the top face of the body portion 10, the tubular portion being used as a handle during both of these last two operations. The ordinary patch is then cemented over the puncture in the ordinary way.

What we claim is:

1. A vent tube and scraper, comprising a tapering body having an opening intermediate its ends, and a plate at the large end formed with roughened surface acting as a scraper.

2. A vent and scraper for inflatable tubes, comprising a tubular body formed of sheet metal and tapering substantially from one end to the other and formed with an opening substantially centrally of the body, the body at the large end merging into a flat plate formed with spurs.

TEMP J. WORRELL.
LONNIE E. CLARK.